United States Patent [19]

Wong

[11] Patent Number: 5,469,782
[45] Date of Patent: Nov. 28, 1995

[54] FOOD FLIPPING ASSEMBLY

[76] Inventor: Don M. Wong, 2296 Bunker Hill Dr., San Mateo, Calif. 94402

[21] Appl. No.: 372,203

[22] Filed: Jan. 13, 1995

[51] Int. Cl.$^6$ ................................................ A47J 27/00
[52] U.S. Cl. ................................ 99/644; 99/352; 99/423
[58] Field of Search ........................... 99/326, 331, 334, 99/348, 352–355, 348, 409, 422–424, 644; 414/758, 737, 764, 421, 781, 225, 783; 426/523, 438

[56] References Cited

U.S. PATENT DOCUMENTS

| | | |
|---|---|---|
| 244,576 | 7/1881 | Fiederlein . |
| 270,277 | 1/1883 | Brookes . |
| 277,876 | 5/1883 | Brown . |
| 536,986 | 4/1895 | Dunlap . |
| 981,381 | 1/1911 | Christoffel ................................ 99/644 |
| 1,934,445 | 11/1933 | Poplawski . |
| 1,940,071 | 12/1933 | Brand . |
| 2,391,571 | 12/1945 | Hennessy ................................ 126/41 |
| 2,543,403 | 2/1951 | Duval ..................................... 99/409 |
| 2,618,219 | 11/1952 | Hummel .................................. 99/330 |
| 2,633,170 | 3/1953 | Balmain .................................. 146/187 |
| 2,848,937 | 8/1958 | Martin ................................... 99/238.3 |
| 2,905,451 | 9/1959 | Callanen . |
| 2,915,959 | 12/1959 | Stott ....................................... 99/345 |
| 3,305,139 | 2/1967 | Ward ..................................... 222/168.5 |
| 3,326,815 | 6/1967 | Werner et al. ........................... 252/314 |
| 3,374,294 | 3/1968 | Goosman ................................ 141/145 |
| 3,426,944 | 2/1969 | French ................................... 222/129 |
| 3,606,526 | 9/1971 | Smith . |
| 3,672,294 | 6/1972 | Blixrud et al. .......................... 99/237 |
| 3,718,487 | 2/1973 | Brunner ................................. 99/423 |
| 3,752,057 | 8/1973 | Groen, Jr. . |
| 3,839,844 | 10/1974 | Garnett .................................. 414/737 |
| 3,905,585 | 9/1975 | Wallman ................................ 259/111 |
| 4,095,832 | 6/1978 | Slinker .................................. 99/397 |
| 4,114,523 | 9/1978 | Eff ........................................ 99/393 |
| 4,177,721 | 12/1979 | Redhead ................................. 99/345 |
| 4,196,660 | 4/1980 | Steinberg ............................... 99/353 |
| 4,199,266 | 4/1980 | Giusti . |
| 4,228,730 | 10/1980 | Schindler et al. ....................... 99/329 |
| 4,234,605 | 11/1980 | Takeuchi ................................ 426/18 |
| 4,238,997 | 12/1980 | Hengstenberg ......................... 99/483 |
| 4,397,561 | 8/1983 | Strong et al. ........................... 366/21 |
| 4,436,432 | 3/1984 | Drocco . |
| 4,439,044 | 3/1984 | Buttiker . |
| 4,459,449 | 4/1984 | Hirata ................................... 219/10.55 |
| 4,503,502 | 3/1985 | Chapin .................................. 364/400 |
| 4,508,028 | 4/1985 | Booker, Jr. ............................. 99/421 |
| 4,534,658 | 8/1985 | De Vries . |
| 4,544,281 | 10/1985 | Wilkinson . |
| 4,571,091 | 2/1986 | Parndo et al. . |
| 4,575,255 | 3/1986 | Kafka . |
| 4,588,301 | 5/1986 | Bolz . |
| 4,606,235 | 8/1986 | Kindt . |
| 4,645,404 | 2/1987 | Juravic ................................. 99/644 |
| 4,649,810 | 3/1987 | Wong .................................... 99/352 |
| 4,662,272 | 5/1987 | Sawyer et al. .......................... 99/334 |
| 4,693,610 | 9/1987 | Weiss . |
| 4,715,273 | 12/1987 | Risselmann ............................ 99/42 |
| 4,779,522 | 10/1988 | Wong .................................... 99/348 |
| 4,820,054 | 4/1989 | Wong .................................... 366/287 |
| 4,936,201 | 6/1990 | Woodworth et al. .................... 99/409 |
| 4,938,125 | 7/1990 | Wong .................................... 99/348 |
| 4,942,807 | 7/1990 | Wong .................................... 414/758 |
| 5,092,757 | 3/1992 | Stein et al. ............................. 99/450.1 |

FOREIGN PATENT DOCUMENTS 2308204  2/1973  Germany .

Primary Examiner—Timothy F. Simone
Attorney, Agent, or Firm—Townsend and Townsend and Crew

[57] ABSTRACT

A food flipping assembly (4), used to automatically flip food 180° while cooking, includes a frame (16) having cam-carrying U-shaped arms (24, 25), and a pair of movable support plates (38) slidably mounted to the U-shaped arms for movement between first and second elevations. A food carrier (20) is pivotally mounted to the support plates for movement about a horizontal axis (22). A food carrier rotator (58) is mounted to the food carrier and has drive elements (60, 63) which engage cam surfaces (64, 66) carried by the arms. Movement of the food carrier from the first elevation to an intermediate elevation does not cause the food carrier to rotate; movement from the intermediate elevation to the second elevation causes the drive elements to engage the cam surfaces thus rotating the food carrier about 135°. Lowering of the food carrier back onto the cooking surface causes the food carrier to complete its 180° rotation.

12 Claims, 6 Drawing Sheets

FOOD FLIPPING ASSEMBLY

BACKGROUND OF THE INVENTION

Various types of cooking appliances have become increasingly popular. Cooks have moved from crock pots, electric frypans and food processors to ever more sophisticated products which not only cook but also prepare food. An example of this is the automatic bread maker which only requires that the basic ingredients be placed into the appliance; everything after that, including mixing, kneading, rising and baking, is automated. U.S. Pat. No. 4,649,810 to Wong and entitled "Automatic Cooking Apparatus" discloses an integrated cooking apparatus for automatically preparing culinary dishes. In one embodiment of that invention, the recipe ingredients are pre-loaded into a compartmentalized carousel, which rotates on command under the control of a microprocessor to bring the appropriate compartment into position for dispensing its ingredients into a cooking vessel. The ingredients are then heated, stirred, covered and uncovered automatically according to a prescribed recipe. For such an automatic cooking apparatus to be able to reproduce a variety of dishes with the delicacy of the accomplished cook, an automatic stirring mechanism which can stir, mix, turn or agitate the ingredients in the manner of the live cook is necessary. U.S. Pat. No. 4,942,807 issued to Wong and entitled "Turning Mechanism" discloses a sophisticated mechanism for turning food items automatically during cooking. The disclosure of both of these patents are incorporated by reference.

SUMMARY OF THE INVENTION

The present invention is directed to a food flipping assembly, used to automatically flip food 180° while cooking, including a frame having a cam-carrying structure, typically U-shaped arms, and a movable carrier support, typically a pair of support plates slidably mounted to the arms of the U-shaped frame, for movement between first and second elevations. A food carrier, such as one designed to be secured to a piece of meat, is pivotally mounted to the movable carrier support for movement about an axis, typically a horizontal axis. A food carrier rotator assembly includes a food carrier rotator mounted to the food carrier. The food carrier rotator includes drive elements which engage cam surfaces carried by the cam-carrying structure so that movement of the food carrier and food carrier rotator therewith from the first elevation to the second elevation causes the drive elements to engage the cam surfaces thus rotating the food carrier substantially more than 90°, and preferably about 135°. Lowering the food carrier back onto the cooking surface causes the food carrier to complete its 180° rotation. The raising and lowering of the food carrier between the first and second elevations takes place through the use of a carrier support lifting assembly operably coupling the cam carrier structure and the carrier support so to move the carrier support, and the food carrier therewith, between the first and second elevations.

The food flipping assembly lifts the food to be flipped or turned prior to beginning the flipping or turning motion. The lifting and turning mechanism can be designed so that neither the food nor the food carrier rubs on the cooking surface during the flipping operation; this eliminates the need to overcome the friction that would be caused by a dragging motion needed to lift up the food prior to turning the food, such as can occur when using the prior art turning device shown in U.S. Pat. No. 4,942,807. This lifting before turning motion reduces the force required to turn the food and prevents possible damage to or wear of the cooking surface. Also, with the invention the entire turning motion can be accomplished with very little additional height required to accommodate the mechanism.

Another advantage of the invention is its basic simplicity and flexibility. It can be used in conjunction with mixing and stirring operations or it can be used alone for only flipping or turning the food.

The flipping assembly can also be adapted for raising and lowering frying baskets instead of flipping food. If desired, the food carrier can be replaced by a specialized turning spatula so to be useful for turning loosely positioned food ingredients on a cooking surface. The invention finds its greatest utility used within the confines of a cooking pot or other cooking vessel. It can, however, be used on an open cooking surface, such as a grill or a griddle. While the invention finds particular utility for flipping meat, it can be also used for flipping or turning other food as well.

Other features and advantages will appear from the following description in which the preferred embodiments have been set forth in detail in conjunction with the accompanying drawings.

DESCRIPTION OF THE PREFERRED EMBODIMENTS

Figure 1:
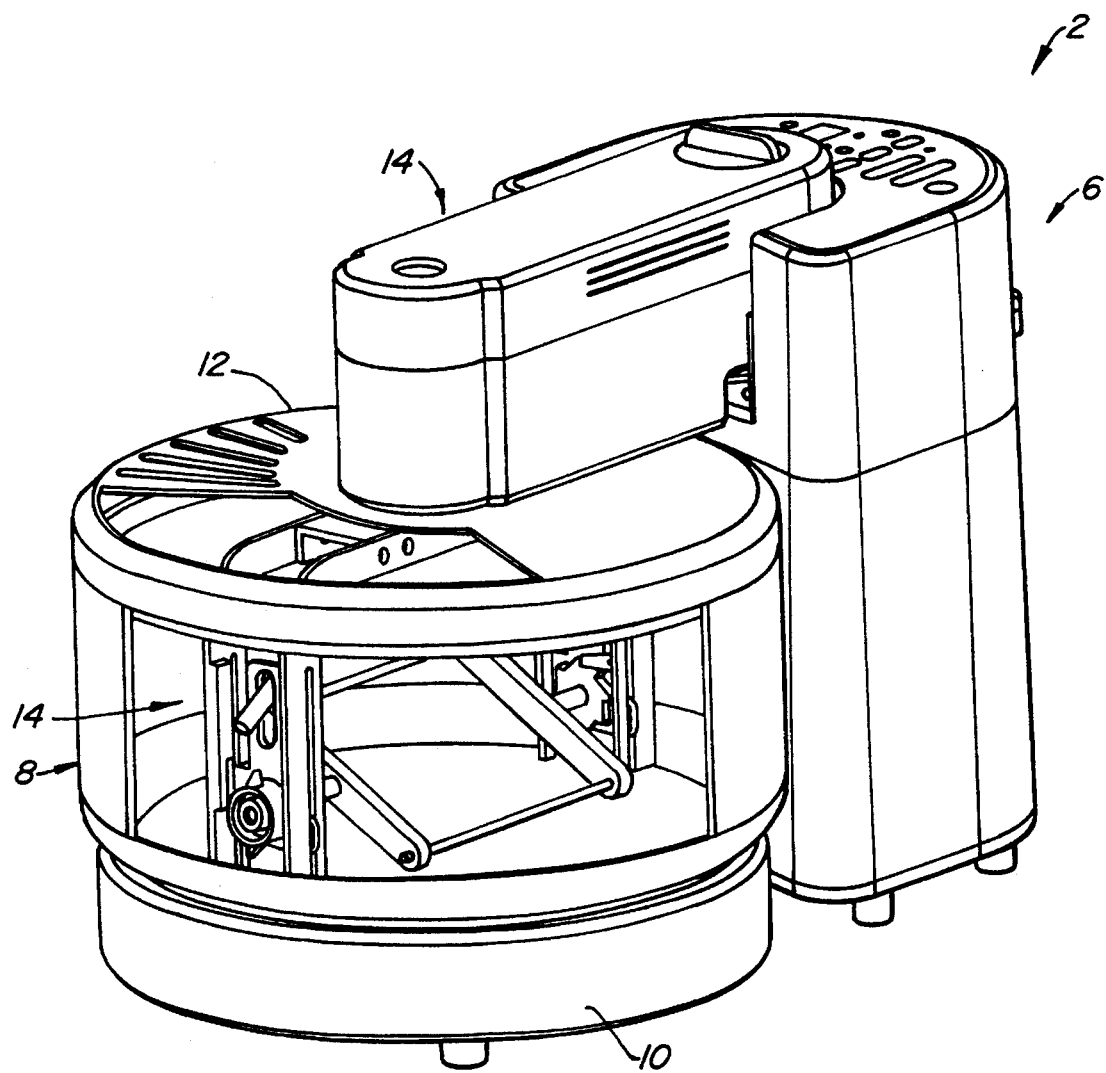
FIG. 1 is a perspective view of an automatic cooking machine using a flipping assembly made according to the invention.

FIG. 1 illustrates an automatic cooking machine 2 incorporating a flipping assembly 4 made according to the invention. The details of the automatic cooking machine except for flipping assembly 4 do not generally form a part of this invention. However, some of the drive components, shown in more detail in FIGS. 3 and 3A, will be described for a complete understanding of the invention. The components of cooking machine 2, with the exception of flipping assembly 4, can be of the type disclosed in U.S. Pat. No. 4,649,810 to Wong.

Cooking machine 2 includes a motor/controller housing 6 containing a drive motor and a microprocessor-based controller, not shown. Machine 2 also includes a cooking vessel 8 supported by a heating base 10 and covered by a lid 12. A drive assembly 14 extends from motor/controller housing 6 and is used to suspend and drive flipping assembly 4 within cooking vessel 8 through lid 12.

Figure 2:
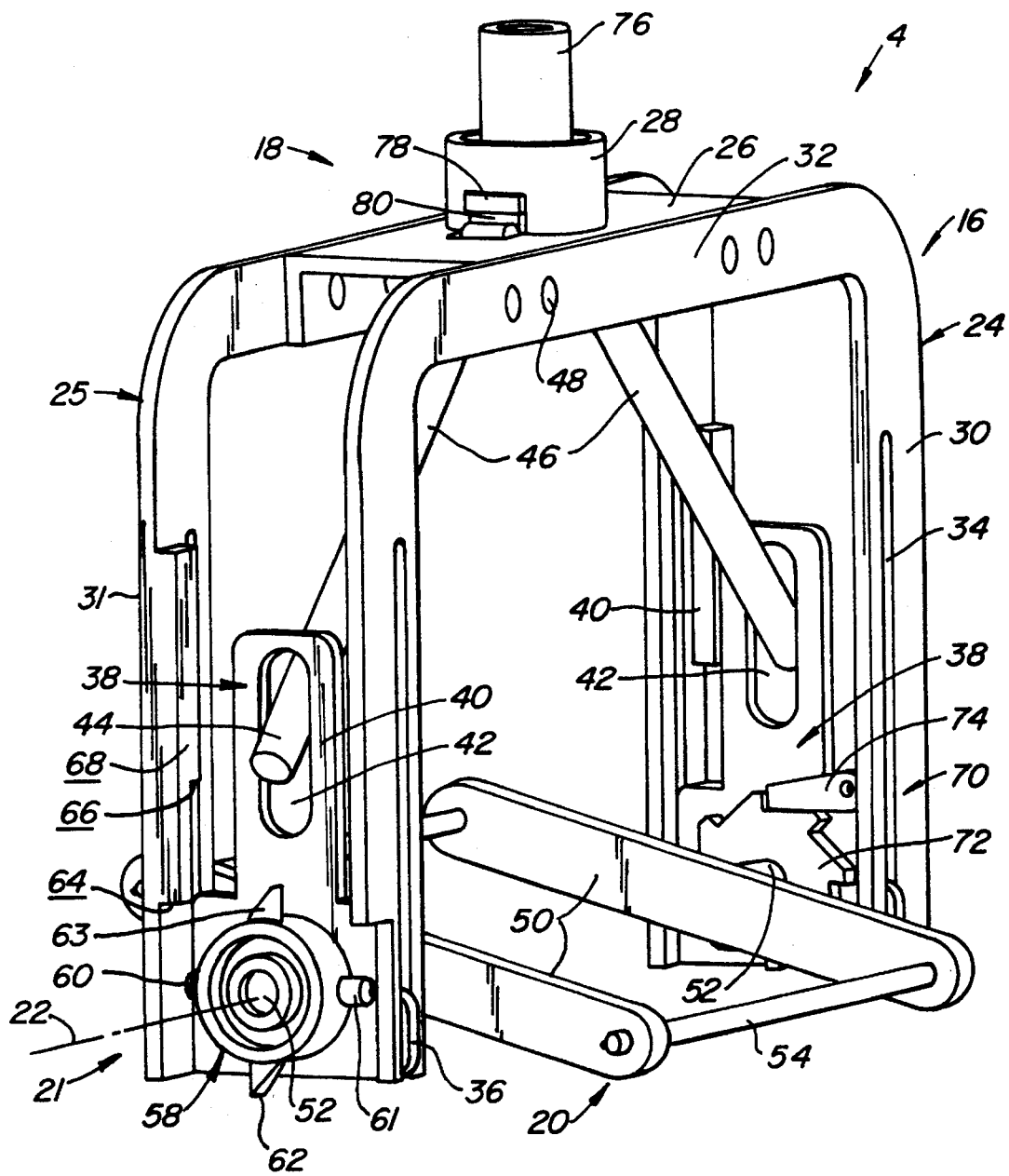
FIG. 2 is an overall view of the flipping assembly of FIG. 1.
Figure 3:
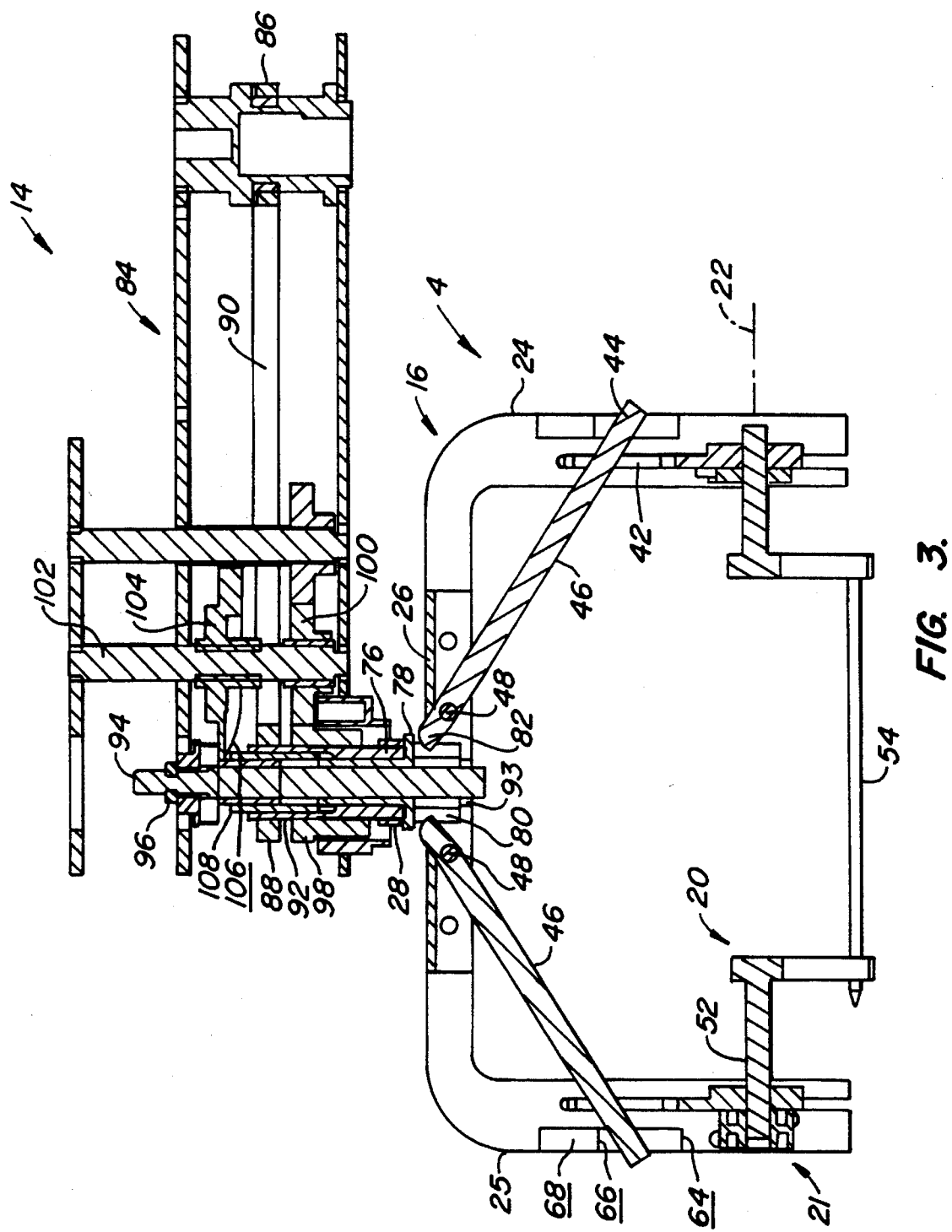
FIG. 3 is a simplified cross-sectional view of the flipping assembly of FIG. 1 coupled to a drive assembly.

Referring now primarily to FIGS. 2 and 3, flipping assembly 4 includes broadly a U-shaped frame 16, a lifting assembly 18 mounted to frame 16, a food carrier 20 mounted to lifting assembly 18 for vertical movement and a food carrier rotator assembly 21 which rotates food carrier 20 about a horizontal pivot axis 22.

Frame 16 includes a pair of U-shaped members 24, 25 secured to one another by a coupler plate 26. Coupler plate 26 has a cylindrical coupler 28 extending upwardly therefrom for the purposes to be discussed below. U-shaped member 24 includes a pair of arms 30 coupled by a bight 32, while U-shaped member 25 includes arms 30, 31 coupled by a bight 32; each arm 30, 31 has a vertically extending guide slot 34 formed therein. Guide slots 34 are used to guide and orient tabs 36 extending from support plates 38, support plates 38 being parts of lifting assembly 18. Each support plate 38 includes an upper extension 40 having a slot 42 formed therein for receipt of the distal end 44 of a pivotal lifting arm 46. Lifting arms 46 are also part of lifting assembly 18 and are pivotally mounted to frame 16 at pivots 48. The way by which lifting arms 46 are raised and lowered will be discussed below.

Food carrier 20 may take a variety of configurations depending on the food being held. In the disclosed embodiment, food carrier 20 includes a pair of side members 50 each having a support shaft 52 rigidly attached thereto and extending horizontally therefrom along pivot axis 22 so to be journaled within support plates 38. A pair of food piercing rods 54 are removably mounted to the ends of side members 50 so that a piece of food, such as a piece of meat, can be positioned between side members 50 and held in place by being impaled by rods 54. Rods 54 can be held in place through a friction fit, threads or other attachment elements.

Food carrier 20 is rotated by food carrier rotator assembly 21. Food carrier rotator assembly 21 includes a star wheel 58 rigidly secured to support shaft 52 so that star wheel 58 rotates with food carrier 20. Star wheel 58 has two pairs of cam pins 60/61, 62/63 adapted to engage cam surfaces 64, 66 formed on arm 31 of U-shaped member 25 as lifting arms 46 raise support plate 38 thus causing star wheel 58 to rotate. It should be noted that cam pins 60, 61 are positioned along axis 22 to engage cam surface 64 while cam pins 62, 63 are positioned to engage cam surface 66. While two star wheels 58 and associated cam surfaces 64, 66 could be used, one star wheel should be sufficient to rotate food carrier 20. The rotational sequence can be seen best with reference to FIGS. 4A–4D.

Figure 4D:
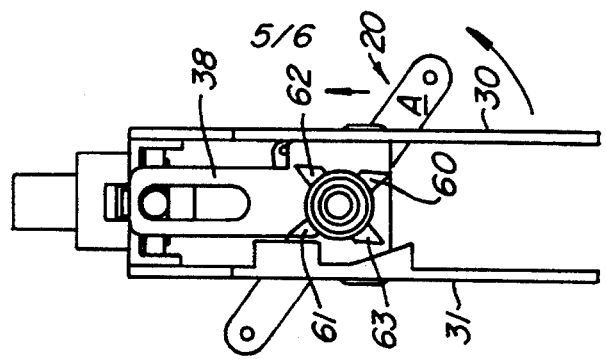
FIGS. 4A–4D are side views showing the flipping assembly of FIG. 2 with the food carrier at a first elevation and a first rotational orientation in FIG. 4A, showing the food carrier being first raised up in FIG. 4B and then continuing to be raised up and rotated in FIGS. 4C and 4D to attain the second elevation and second rotary orientation, about 135° from the first rotary orientation of FIG. 4A, in FIG. 4D.
Figure 4C:
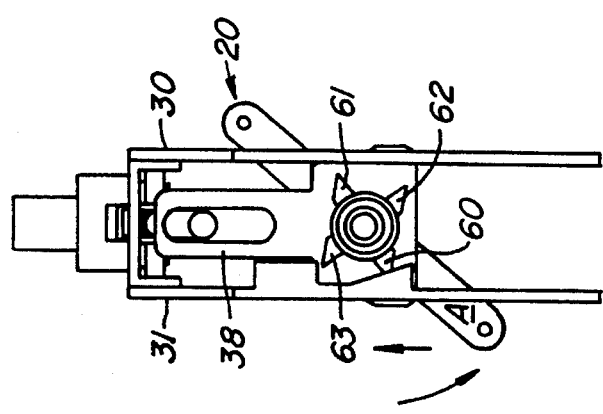
Figure 4B:
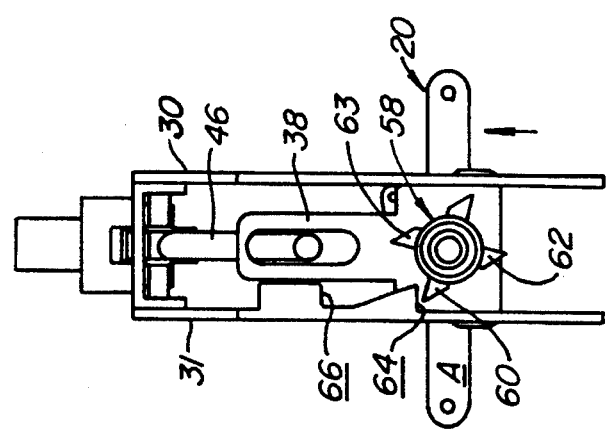
Figure 4A:
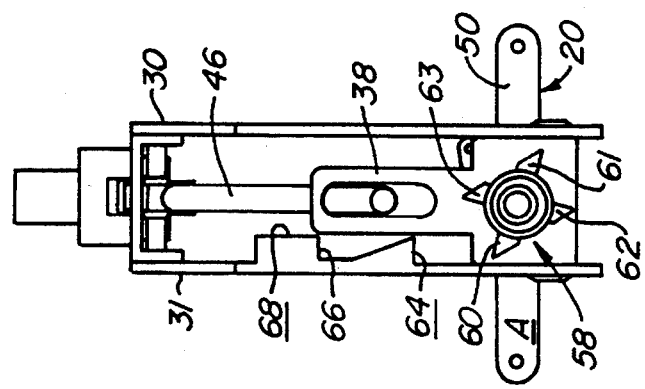

FIG. 4A illustrates food carrier 20 at a first elevation and at a first rotary orientation. The leftmost end of side member 50 is marked with the letter A to indicate its position in each of the figures. The upward pivoting of lifting arms 46 causes support plates 38 to raise. This initial movement, shown in FIG. 4B, raises food carrier 20 but does not rotate the food carrier since when star wheel 58 is in the position of FIG. 4B, cam pin 60 is just about to engage cam surface 64. In the position of FIG. 4C, cam pin 60 has been engaged by cam surface 64 and cam pin 62 is just about to engage cam surface 66. In the position of FIG. 4D, cam pin 62 has finished its engagement with cam surface 66 and cam pin 61 is engaging arm surface 68 to direct food carrier to the position of FIG. 4D, that is, at a second elevation and at a second rotary orientation, which is about 135° rotated from the rotary orientation of FIG. 4A. Lowering support plates 38 by the downward pivotal movement of pivotal lifting arms 46 causes food carrier 20 to once again attain the position of FIG. 4A as the food carrier contacts the cooking surface of, for example, cooking vessel 8. Thus the final rotation of food carrier 20 from the position of FIG. 4D back to the position of FIG. 4A is caused by the food (not shown) and/or food carrier 20 resting against the cooking surface.

To prevent reverse rotary rotation of food carrier 20, a ratchet 70 is used on the opposite side of U-shaped frame from star wheel 58. Ratchet 70 includes a ratchet wheel 72 keyed to support shaft 52 and a pawl 74 pivotally mounted to support plate 38. If desired, other types of anti-rotation devices, and sometimes even frictional resistance, can be used to prevent the reverse rotation of food carrier 20.

Figure 3A:
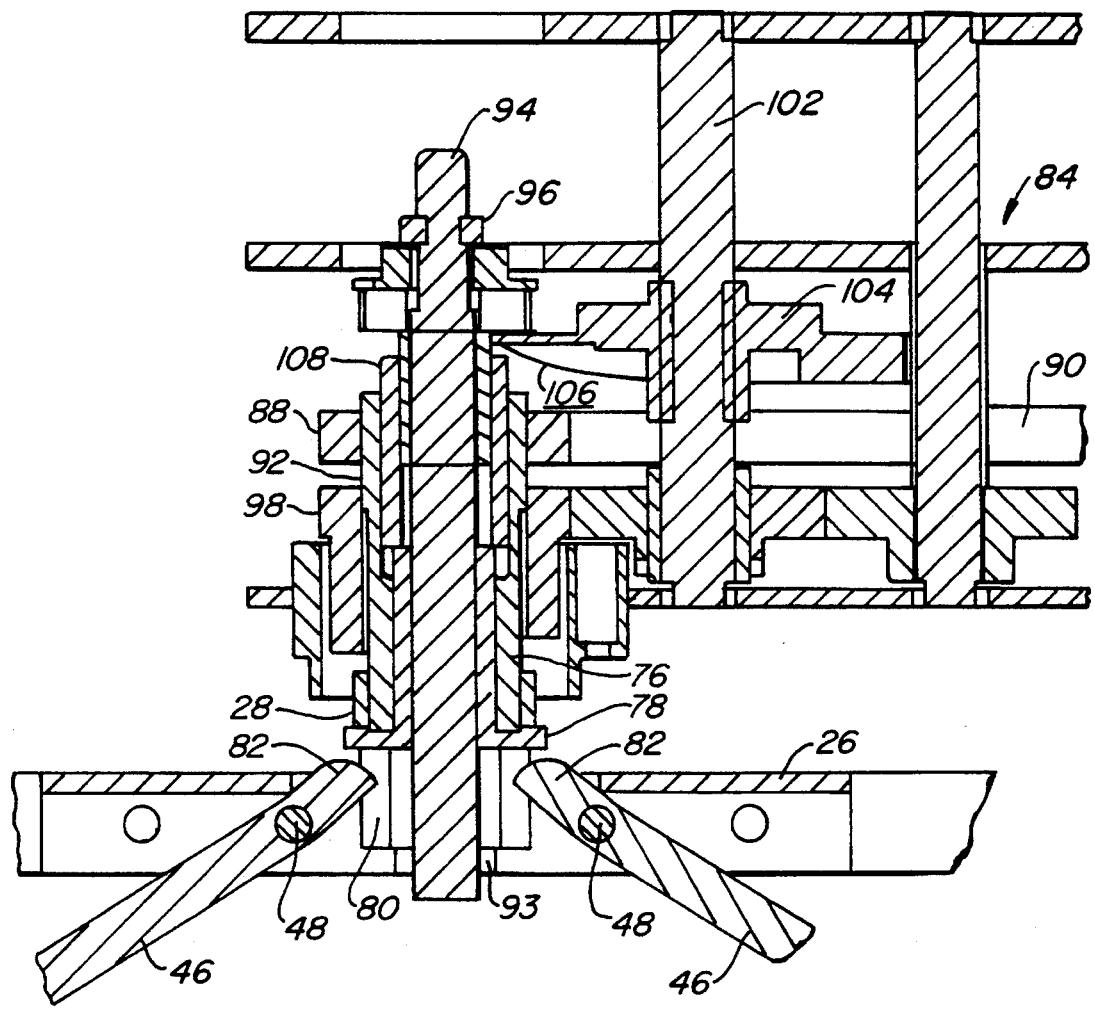
FIG. 3A is an enlarged view of a portion of the drive assembly of FIG. 3.

Referring to FIGS. 3 and 3A, drive assembly 14 will be described. Drive assembly 14 includes a drive cylinder 76 mounted for vertical movement within cylindrical coupler 28. Drive cylinder 76 includes a pair of wings 78 which pass through openings 80 formed in cylindrical coupler 28. Wings 78 are positioned to overlie the rounded proximal ends 82 of lifting arms 46 so that movement of drive cylinder 76 downwardly causes wings 78 to engage ends 82 thus pivoting arms 46 about pivots 48 thus raising support plates 38. Due to the short distances between pivots 48 and proximal ends 82 and the long distances between pivots 48 and slots 42 through which lifting arms 46 pass, a relatively short axial movement of drive cylinder 76 causes a relatively large lifting distance of support plates 38. In the preferred embodiment movement of drive cylinder 76, a distance of 0.35" causes lifting arms 46 to move upwardly thus raising support plates 38 a distance of about 2.5" to produce a lever arm advantage of about 7 to 1.

Drive assembly 14 includes a gear box 84 housing a drive pulley 86 connected to a driven pulley 88 by a belt 90. Pulley 88 is keyed to a cylindrical driver 92 which is keyed to cylindrical coupler 28. Thus, rotating driven pulley 88 causes driver 92, cylindrical coupler 28 and thus flipping assembly 4 to rotate as well. This aspect of rotating flipping assembly 4 and thus food carrier 20 is optional.

Flipping assembly 4 is supported in its vertical position by a bracket 93 which couples assembly 4 to the lower end of main shaft 94. Main shaft 94 is free to rotate within drive cylinder 76 and is supported at its upper end by gear box 84 through a clip or latch 96. Cylindrical driver 92 has a gear 98 keyed to it which drives a second gear 100 keyed to a gear shaft 102. Gear shaft 102 has a third gear 104; third gear 104 has a downwardly-facing circular cam surface 106 which engages a cylindrical tube 108; tube 108 is free to move axially within cylindrical driver 92. The lower end of cylindrical tube 108 contacts the upper end of cylindrical driver 76. As third gear 104 rotates, circular cam surface 106 pushes on the upper edge of cylindrical tube 108 forcing cylindrical tube 108 downwardly against the upper end of drive cylinder 76, which also floats freely axially within cylindrical driver 92. This downward movement of tube 108 and cylinder 76 is what causes proximal ends 82 to be driven downwardly thus raising distal ends 44 of lifting arms 46. It should be noted in FIGS. 3 and 3A, there is a gap between drive cylinder 76 and proximal ends 82 and between the upper end of tube 108 and cam surface 106 for clarity of illustration. In practice these components will typically contact one another due to the weight of the various components.

In use, a piece of food is mounted to food carrier 20 and the approximate settings are made to motor/controller housing 6. At the appropriate time during cooking, gear 104 is rotated causing distal ends 44 of lifting arms 46 to pivot upwardly thus raising support plates 38. Doing so causes food carrier rotator assembly 21 to first raise and then raise and rotate food carrier 20 as the food carrier moves from the first elevation and first rotary orientation of FIG. 4A to the second elevation and second rotary orientation of FIG. 4D. The latter occurs when a high point of circular cam surface 106 engages the upper end of cylindrical tube 108. Due to the weight of lifting arms 46, support plates 38, rotator 21 and food carrier 20, drive cylinder 76 and cylinder tube 108 tend to move upwardly. Continued movement of gear 104 causes cam surface 106 to continue moving along cylinder tube 108 until a low point along circular cam surface 106 engages the cylindrical tube allowing distal ends 44 of arms 46 to drop thus permitting food carrier 20 and the food carrier therewith to once again rest against the cooking surface of cooking vessel 8.

Figure 5:
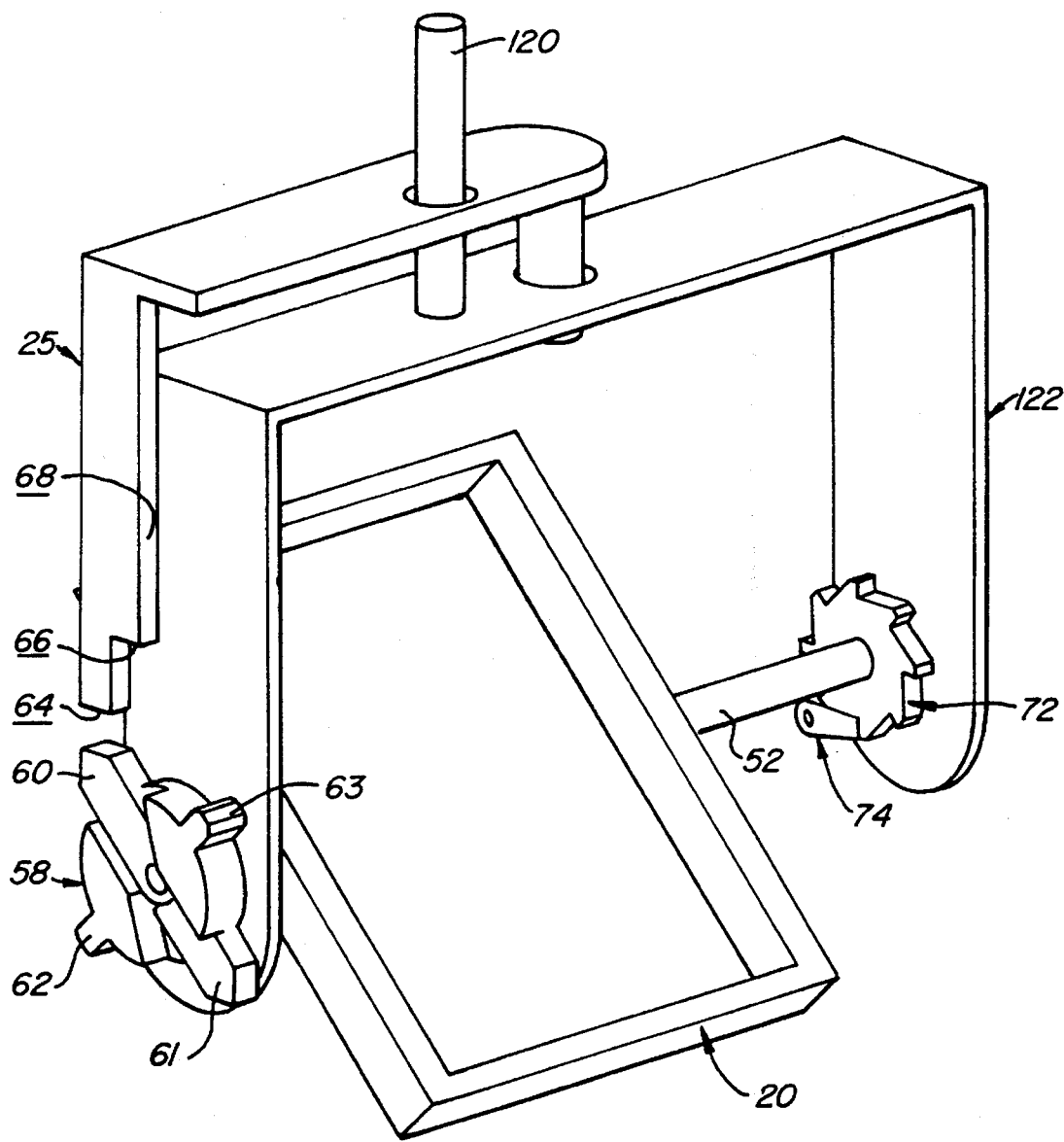
FIG. 5 shows an alternative embodiment of the flipping assembly of FIG. 2.

FIG. 5 illustrates an alternative embodiment of the invention with like reference numerals each referring to like structure. In this embodiment the particular lifting assembly used to raise lift shaft 120 and thus lifter 122 is not shown. The basic concept is the same as for the embodiment of FIGS. 1–4D and thus its operation will not be discussed in detail. However, cam pins 60–63 are at the same axial position; to help accommodate engagement of cam pin 60 with surface 68, cam pin 60 can pivot about 30° to prevent binding of cam pin 60 when lifter 122 is lowered. This problem is eliminated by the axial offset of cam pins 60, 61 relative to cam pins 62, 63 as in the embodiment of FIGS. 1–4D.

The various components can be made from food grade materials, preferably stainless steel for most of the rigid structural components, suitable for use at the cooking temperatures and environment encountered. Non-stick coatings can be used for certain surfaces, such as for covering aluminum surfaces, as well. Appropriate FDA-approved, high temperature plastics can be used if desired.

Other modifications and variations can be made to the disclosed embodiments without departing from the subject of the invention as defined in the following claims. For example, other lifting devices such as scissors lifting devices, rack and pinion lifting devices, chain and sprocket lifting devices, could be used instead of the pivot arms lifting device. Rotator assembly 21 can be made from other rotary device assemblies such as rack and pinion assemblies, pulley/drive belt assemblies or worm/gear assemblies.

What is claimed is:

1. A food flipping assembly comprising:
   a frame having a cam-carrying structure and a movable carrier support;
   a carrier support lifting assembly operably coupling the cam-carrying structure and the carrier support for moving the carrier support between a first elevation and a second elevation;
   a food carrier rotatably mounted to the carrier support for rotation about an axis and for movement with the carrier support between the first elevation and a first rotary orientation and the second elevation; and
   a food carrier rotator assembly including:
      a food carrier rotator mounted to the food carrier and including drive elements; and
      rotator cam surfaces carried by the cam-carrying structure and located to engage the drive elements as the food carrier moves from an intermediate elevation intermediate the first and second elevations to the second elevation thereby rotating the food carrier about the axis to an intermediate rotary orientation substantially more than 90° from a first rotary orientation;
   whereby upon movement of the food carrier from the second elevation to the first elevation, the food carrier is rotated to a second rotary orientation about 180° from the first rotary orientation by contact with a support surface thereby completing the flipping of any food carried by the food carrier.

2. The assembly according to claim 1 wherein:
   the cam-carrying structure includes a U-shaped member; and
   the carrier support includes first and second support plates slidably mounted to the U-shaped member.

3. The assembly according to claim 2 wherein the carrier support lifting assembly includes first and second lifting arms having proximal ends and distal ends and pivotally mounted to the U-shaped member near the proximal ends, the distal ends liftingly engaging the support plates.

4. The assembly according to claim 3 wherein the carrier support lifting assembly includes means for driving the proximal ends of the lifting arms downwardly thereby lifting the distal ends of the lifting arms and the support plates therewith.

5. The assembly according to claim 3 further comprising:
   a vertically slidable cylinder tube having an upper end and being coupled to the proximal ends of the lifting arms; and
   a downwardly-facing circular cam surface engaging the upper end of the cylinder tube thereby driving the cylinder tube and the lifting arms therewith according to the rotary orientation of the circular cam surface.

6. The assembly according to claim 1 wherein the food carrier includes a food-piercing member.

7. The assembly according to claim 1 wherein the food carrier rotator includes a central element and radially-extending cam pins as the drive elements.

8. The assembly according to claim 7 wherein the cam pins are at different locations along said axis.

9. The assembly according to claim 1 wherein the intermediate rotary orientation is about 135°.

10. The assembly according to claim 1 further comprising an anti-reverse device carried by the carrier support and operable to limit substantial rotary motion of the food carrier to a single rotary direction.

11. A food flipping assembly comprising:
   a food carrier adapted to carry food to be cooked;
   means for moving the food carrier between first and second elevations, the food carrier in a first rotary orientation when at the first elevation;
   means for rotating the food carrier about an axis:
      to an intermediate rotary orientation substantially more than 90° from the first rotary orientation as the moving means moves the food carrier from an intermediate elevation intermediate the first and second elevations to the second elevation; and
      to a second rotary orientation about 180° from the first rotary orientation as the moving means moves the food carrier from the second elevation to the first elevation thereby flipping any food carried by the food carrier.

12. The assembly according to claim 11 wherein the intermediate rotary orientation is about 135° from the first rotary orientation.

* * * * *